(12) United States Patent
Peterson et al.

(10) Patent No.: US 12,479,318 B2
(45) Date of Patent: Nov. 25, 2025

(54) CHARGING INLET ASSEMBLY HAVING A POWER HARNESS

(71) Applicant: TE Connectivity Solutions GmbH, Schaffhausen (CH)

(72) Inventors: Kevin John Peterson, Kernersville, NC (US); Nathan Philip Myer, Lancaster, PA (US); Clara Marguerite Rhodes, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 313 days.

(21) Appl. No.: 18/354,731

(22) Filed: Jul. 19, 2023

(65) Prior Publication Data

US 2025/0026211 A1  Jan. 23, 2025

(51) Int. Cl.
*B60L 53/16* (2019.01)
(52) U.S. Cl.
CPC .................................. *B60L 53/16* (2019.02)

(58) Field of Classification Search
CPC ....... B60L 53/16; H01R 13/502; H01R 13/40; H01R 13/5202; H01R 13/5205
USPC ......................................................... 174/73.1
See application file for complete search history.

(56) References Cited

U.S. PATENT DOCUMENTS 11,427,099 B2 *   8/2022   Lyon ........................ B60L 53/16

* cited by examiner

*Primary Examiner* — Timothy J Thompson
*Assistant Examiner* — Michael F Mcallister

(57) ABSTRACT

A power harness for a charging inlet assembly includes a harness housing holding a power cable in a cable slot A ring insert of the power cable is aligned with a bore of a hub of the housing that receives a threaded bolt with an insulating cover and an insulating cap. A contact ring is received in the hub with a first end connected to the ring insert and a second end electrically connected to a charging terminal. A threaded socket is received in the hub and passes through the contact ring for threadably coupling to the charging terminal. The outer end of the threaded socket has a threaded bore receiving the threaded shaft of the threaded bolt.

20 Claims, 4 Drawing Sheets

CHARGING INLET ASSEMBLY HAVING A POWER HARNESS

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Cable harnesses are coupled to the AC terminals and the DC terminals and extend to other system components, such as the battery. Problems arise at the electrical connections between the cable harnesses and the charging terminals. For example, high resistance at the interface may lead to increased heat generation and diminished current flow through the transition. Additionally, space is limited for routing and connection of the cable harnesses to the charging terminals. Moreover, servicing of the charging inlet assembly and the terminals and cable harness is difficult. Service typically involves disassembly and removal of the charging inlet assembly and the cable harness from the vehicle for service, which is time consuming and costly to repair. Some known systems allow the terminals to be individually removed from the housing, which is time consuming. However, other known systems do not allow removal of the terminals from the charging inlet assembly, leading to replacement of the entire assembly.

A need remains for an improved charging inlet assembly.

BRIEF DESCRIPTION OF THE INVENTION

In one embodiment, a power harness for a charging inlet assembly of a vehicle is provided. The power harness includes a power cable having a cable body that extends to a terminating end. The power cable includes a ring insert electrically connected to the cable body. The power harness includes a harness housing that has a chamber including a cable slot and a hub with a bore passing through the harness housing. The cable slot receives the terminating end of the power cable. The ring insert is aligned with the bore. The harness housing has a mating end configured to be mated with a housing of the charging inlet assembly. The power harness includes a threaded bolt received in the hub and passes through the bore. The threaded bolt passes through the ring insert. The threaded bolt includes a head and a threaded shaft. The threaded bolt includes an insulating cover on the head. The threaded bolt includes an insulating cap at a distal end of the threaded shaft. The power harness includes a contact ring received in the hub and is aligned with the ring insert in the bore. The contact ring has an opening between a first end and a second end. The first end engages and is electrically connected to the ring insert. The second end is configured to be electrically connected to a charging terminal of the charging inlet assembly. The power harness includes a threaded socket received in the hub and is aligned with the ring insert in the bore. The threaded socket is received in the opening of the contact ring and passes through the contact ring. The threaded socket extends between an inner end and an outer end. The inner end has external threads configured to be threadably coupled to the charging terminal of the charging inlet assembly. The outer end has a threaded bore receiving the threaded shaft of the threaded bolt. The threaded bolt is threadably coupled to the threaded socket.

In another embodiment, a charging inlet assembly is provided and includes a housing that extends between a front and a rear. The housing has a charging socket configured to receive a charging connector at the front. The housing includes terminal channels in the charging socket. The charging inlet assembly includes charging terminals received in the terminal channels. The charging terminals include pins at the front for mating with the charging connector. The charging terminals include terminating portions at the rear. The terminating portions include threaded bores. The charging inlet assembly includes power harnesses coupled to the terminating portions of the corresponding charging terminals. Each power harness includes a power cable that has a cable body extending to a terminating end. The power cable includes a ring insert electrically connected to the cable body. The power harness includes a harness housing having a chamber that includes a cable slot and a hub with a bore passing through the harness housing. The cable slot receives the terminating end of the power cable. The ring insert is aligned with the bore. The harness housing has a mating end mated with the housing of the charging inlet assembly. The power harness includes a threaded bolt received in the hub and passes through the bore. The threaded bolt passes through the ring insert. The threaded bolt includes a head and a threaded shaft. The threaded bolt includes an insulating cover on the head. The threaded bolt includes an insulating cap at a distal end of the threaded shaft. The power harness includes a contact ring received in the hub and aligned with the ring insert in the bore. The contact ring has an opening between a first end and a second end. The first end engages and is electrically connected to the ring insert. The second end is configured to be electrically connected to a charging terminal of the charging inlet assembly. The power harness includes a threaded socket received in the hub and aligned with the ring insert in the bore. The threaded socket is received in the opening of the contact ring and passes through the contact ring. The threaded socket extends between an inner end and an outer end. The inner end has external threads configured to be threadably coupled to the charging terminal of the charging inlet assembly. The outer end has a threaded bore receiving the threaded shaft of the threaded bolt. The threaded bolt is threadably coupled to the threaded socket.

In a further embodiment, a charging inlet assembly is provided and includes a housing that extends between a front and a rear. The housing has a charging socket configured to receive a charging connector at the front. The housing includes terminal channels in the charging socket. The charging inlet assembly includes charging terminals received in the terminal channels. The charging terminals include pins at the front for mating with the charging connector. The charging terminals include terminating portions at the rear. The terminating portions include threaded bores. The charging inlet assembly includes power harnesses coupled to the terminating portions of the corresponding charging terminals. Each power harness includes a power cable that has a cable body extending to a terminating end. The power cable includes a ring insert electrically connected to the cable body. The power cable includes a cable seal surrounding and is sealed to the power cable. The power cable includes a cable seal cap holding the cable seal on the terminating end of the cable body. The power harness includes a harness housing that has a chamber and includes a cable slot and a hub with a bore passing through the harness housing. The cable slot receives the terminating end of the power cable. The ring insert is aligned with the bore. The harness housing has a mating end mated with the housing of the charging inlet assembly. The power harness includes a threaded bolt received in the hub and passes through the bore. The threaded bolt passes through the ring insert. The threaded bolt includes a head and a threaded shaft. The threaded bolt includes an insulating cover on the head. The threaded bolt includes an insulating cap at a distal end of the threaded shaft. The threaded bolt includes a bolt seal sealed between the threaded bolt and the harness housing. The power harness includes a contact ring received in the hub and aligned with the ring insert in the bore. The contact ring has an opening between a first end and a second end. The first end engages and is electrically connected to the ring insert. The second end is configured to be electrically connected to a charging terminal of the charging inlet assembly. The power harness includes a threaded socket received in the hub and aligned with the ring insert in the bore. The threaded socket is received in the opening of the contact ring and passes through the contact ring. The threaded socket extends between an inner end and an outer end. The inner end has external threads configured to be threadably coupled to the charging terminal. The outer end has a threaded bore receiving the threaded shaft of the threaded bolt. The threaded bolt is threadably coupled to the threaded socket. The power harness includes a mating seal configured to seal between the harness housing and the housing.

DETAILED DESCRIPTION OF THE INVENTION

Figure 1:
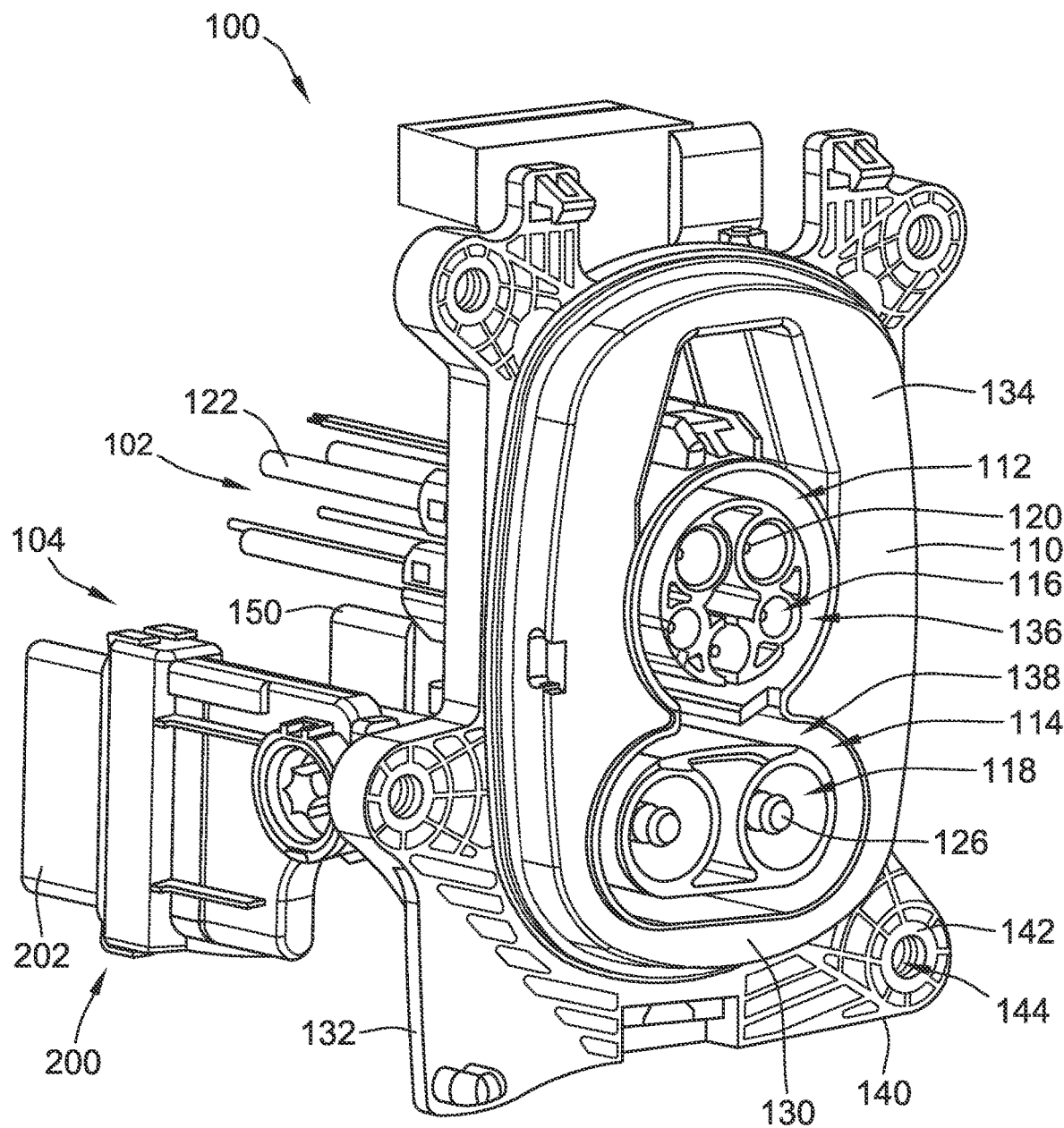
FIG. 1 is a front view of a charging inlet assembly including an AC charging module and a DC charging module in accordance with an exemplary embodiment.
Figure 2:
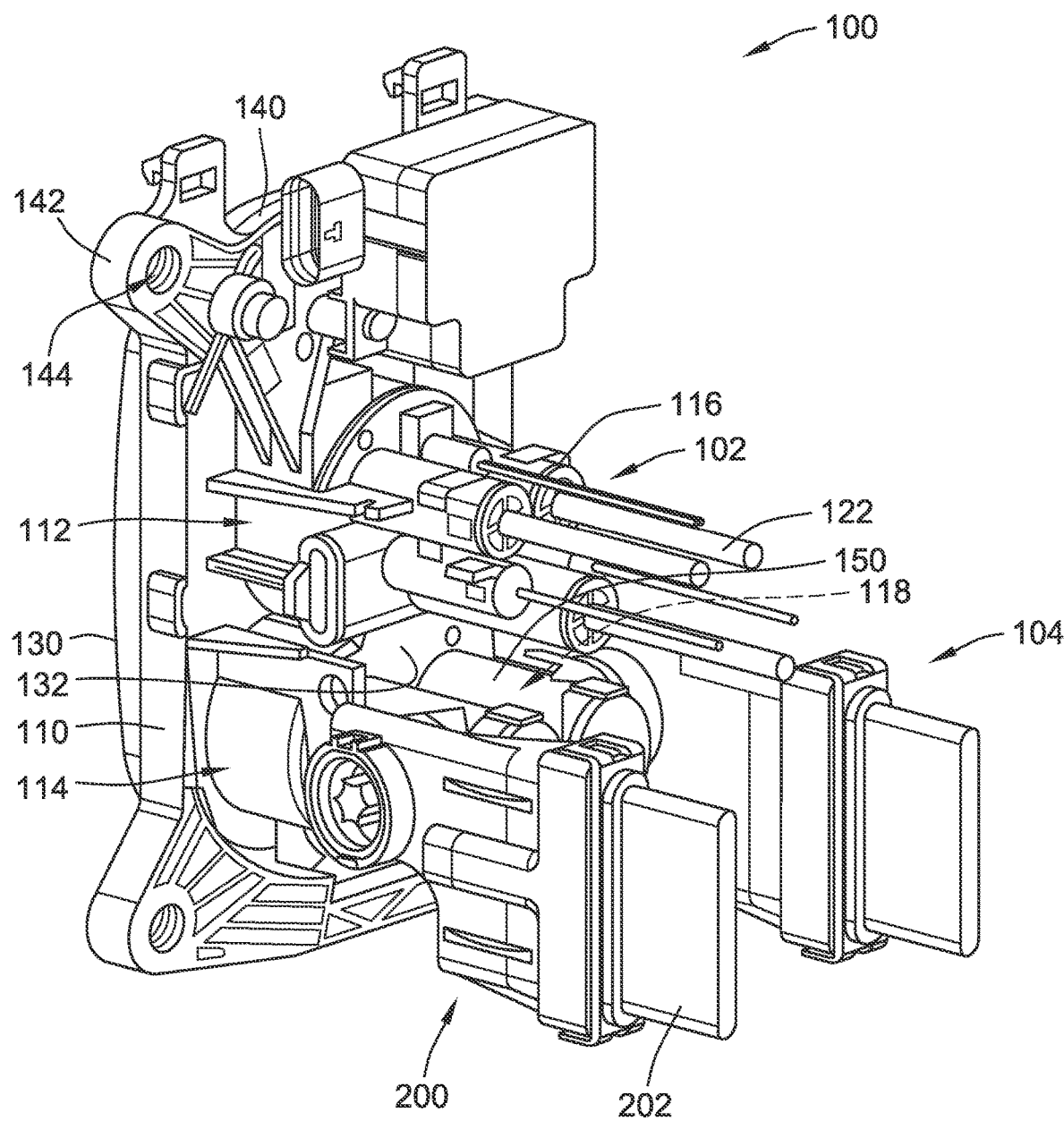
FIG. 2 is a rear perspective view of the charging inlet assembly showing the AC charging module and the DC charging module in accordance with an exemplary embodiment.

FIG. 1 is a front view of a charging inlet assembly 100 including an AC charging module 102 and a DC charging module 104 in accordance with an exemplary embodiment. FIG. 2 is a rear perspective view of the charging inlet assembly 100 showing the AC charging module 102 and the DC charging module 104 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, the AC charging module 102 and/or the DC charging module 104 are removable from the housing 110. For example, the charging modules 102, 104 may be coupled to the housing 110 using fasteners, latches, clips, or other securing means. The charging modules 102, 104 may include multiple components individually coupled to and removable from the housing 110. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The AC charging module 102 includes AC terminals 120 at the AC section 112. The AC terminals 120 are held in the housing 110 by the AC charging module 102. The AC terminals 120 are received in corresponding AC terminal channels 116. The AC terminals 120 are configured to be mated to the charging connector. In the illustrated embodiment, five AC terminals 120 are provided, including a pair of AC charging terminals, a ground terminal, a proximity terminal, and a pilot terminal. Optionally, the AC terminals 120 may be different sized terminals. In an exemplary embodiment, the AC terminals 120 include pins at mating ends of the AC terminals 120. AC cables 122 (FIG. 2) are terminated to the AC terminals 120 and extend from the charging inlet assembly 100 to another component of the vehicle, such as the battery system of the vehicle. In various embodiments, the AC cables 122 may extend straight away from the AC charging module 102 and housing 110. In other various embodiments, the AC cables 122 may extend away from the AC charging module 102 and housing 110 at 90° (for example, right angle) or at other angles.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be a socket connector configured to receive the charging plug. Seals may be provided at the interface of the low-voltage connector.

The DC charging module 104 includes DC charging terminals 126 at the DC section 114. The charging terminals 126 are received in corresponding charging terminal channels 118 and held in the housing 110. The charging terminals 126 are configured to be mated to the charging connector. In the illustrated embodiment, two charging terminals 126 are provided. In an exemplary embodiment, the charging terminals 126 include pins at mating ends of the charging terminals 126. In an exemplary embodiment, power harnesses 200 are terminated to the charging terminals 126 and extend from the charging inlet assembly 100 to another component of the vehicle, such as the battery system of the vehicle. The power harnesses 200 include DC power cables 202, which may be solid busbars, stranded cables, or other types of power cables. In various embodiments, the power cables 202 may extend straight away from the housing 110, such as rearward. In other various embodiments, the power cables 202 may extend away from the housing 110 at other angles, such as 90° (for example, downward) or at other angles.

In an exemplary embodiment, the DC section 114 of the charging inlet assembly 100 defines a high-voltage connector configured to be coupled to the high-voltage portion of the charging connector. The high-voltage connector (for example, the charging terminals 126 and the power cables 202) is configured to be coupled to other components in the system, such as the battery and/or the battery distribution unit of the vehicle. The high-voltage connector is used for fast charging of the battery. The high-voltage connector may be a socket connector configured to receive the charging plug. Seals may be provided at the interface of the high-voltage connector.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. The housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the charging terminals 126 that receive the charging connector. The DC charging connector is configured to be plugged into the DC socket 138. During charging, the DC charging connector is plugged into the DC socket 138 to electrically connect to the charging terminals 126. The panel 134 may surround the AC socket 136 and the DC socket 138 at the front 130.

In an exemplary embodiment, the housing 110 includes a mounting flange 140 (FIG. 1) coupled to the panel 134 at the front 130. The mounting flange 140 includes mounting tabs 142 used for mounting the housing 110 to the vehicle. The mounting tabs 142 have openings 144 that receive fasteners (not shown) to secure the charging inlet assembly 100 to the vehicle. Other types of mounting features may be used to secure the charging inlet assembly 100 to the vehicle. The housing 110 and/or the mounting flange 140 may include a seal (not shown) to seal the charging inlet assembly 100 to the vehicle.

In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

In an exemplary embodiment, the housing 110 includes tubes 150 at the rear 132. The tubes 150 surround the corresponding terminal channels 116, 118. The terminals 120, 126 are received in corresponding tubes 150. The power harnesses 200 are mounted to the housing 110 at the tubes 150 holding the DC charging terminals 126. The tubes 150 may be generally cylindrical; however, the tubes 150 may have other shapes in alternative embodiments.

Figure 3:
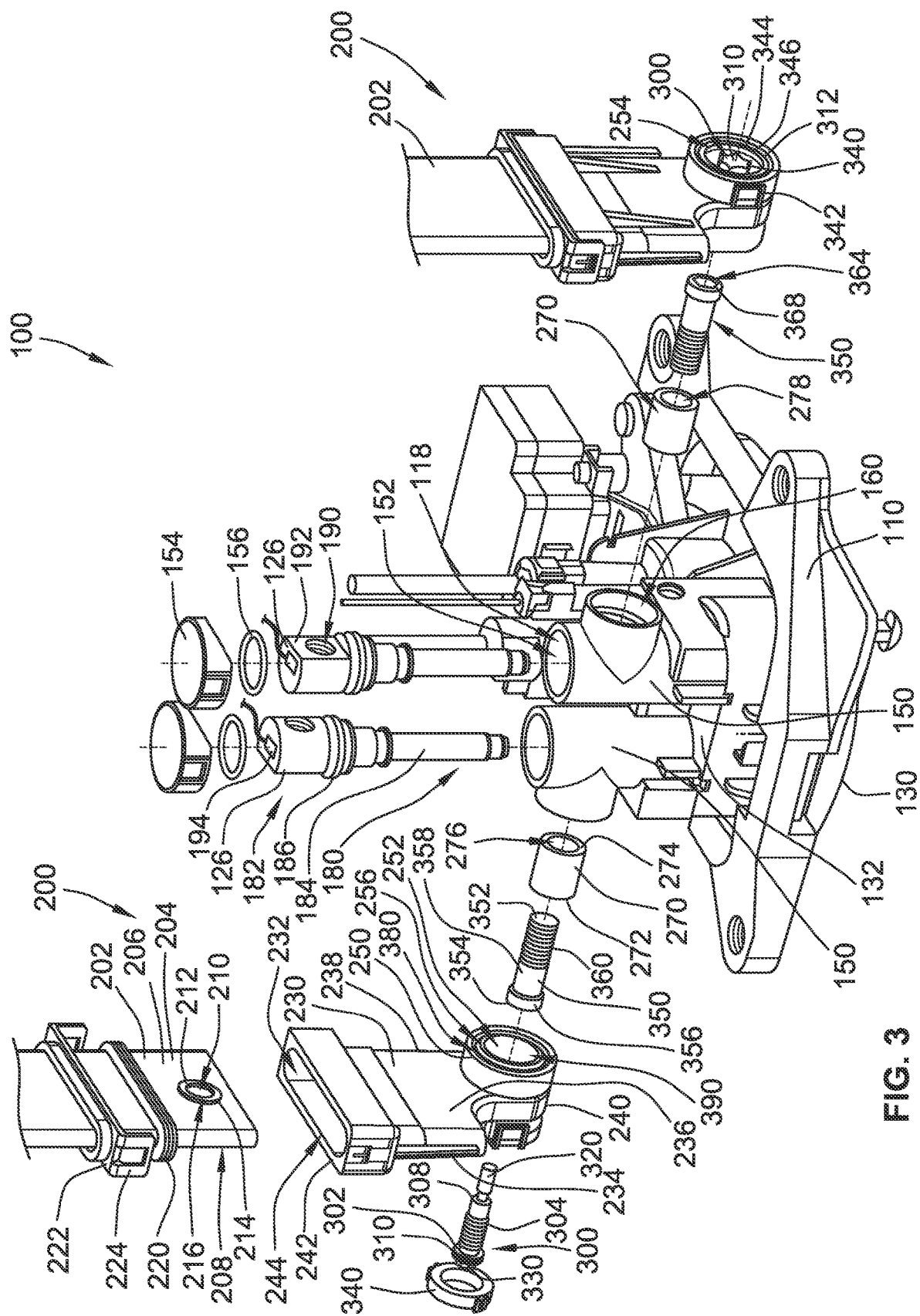
FIG. 3 is an exploded view of the charging inlet assembly in accordance with an exemplary embodiment.

FIG. 3 is an exploded view of the charging inlet assembly 100 in accordance with an exemplary embodiment. FIG. 3 shows a pair of the power harnesses 200 configured to be coupled to the corresponding charging terminals 126. Each power harness 200 includes the power cable 202 and components to mechanically and electrically connect the power cable 202 to the charging terminal 126. The power harness 200 provides a separable interface in the power transmission line between the charging inlet assembly 100 and another component, such as the battery.

In an exemplary embodiment, the power harness 200 is connected to the charging terminal 126 and/or the housing 110 using threaded fasteners, such as a threaded bolt received in a threaded insert to mechanically and electrically connect the power cable 202 to the charging terminal 126. In an exemplary embodiment, the power harness 200 is compact configured to occupy not much more space (for example, height and/or width and/or length) than the power cable 202. In an exemplary embodiment, the power harness 200 forms a sealed interface with the housing 110. In an exemplary embodiment, the power harness 200 is touch safe, wherein any and all live conductive elements are insulated to prevent short circuiting, arcing, or injury from touching the live element. The power harness 200 is touch safe both in the mated condition and the unmated condition. In an exemplary embodiment, the power harness 200 is vibration resistant to maintain a reliable electrical connection along the power transmission line. In an exemplary embodiment, the power harness 200 may be mated at various orientations relative to the housing 110. For example, the power cable 202 may extend away from the connection at different angles, such as 180°, 90° or at other angles. However, in alternative embodiments, the power harness 200 may have a single mating orientation.

In an exemplary embodiment, the housing 110 is open at the rear 132 to receive the charging terminals 126. For example, the tubes 150 include openings 152 at the rear 132. The charging terminals 126 may be rear loaded into the terminal channels 118. In an exemplary embodiment, covers 154 are coupled to the tubes 150 at the rear 132 to close the openings 152 after the charging terminals 126 are loaded into the terminal channels 118. In an exemplary embodiment, cover seals 156 are provided to seal the openings 152. The cover seals 156 may be coupled to the covers 154 to interface with the housing 110 when the cover seals 156 are coupled to the housing 110. Optionally, the covers 154 may be latchably coupled to the housing 110. In an exemplary embodiment, the tubes 150 includes side ports 160 that provide access to the terminal channels 118. The power harnesses 200 are coupled to the housing 110 at the side ports 160. For example, portions of the power harnesses 200 may be plugged into the side ports 160 to interface with the charging terminals 126. In the illustrated embodiment, the side ports 160 are cylindrical; however, the side ports 160 may have other shapes in alternative embodiments. Optionally, keying features may be provided at the side ports 160 for keyed mating with the power harnesses 200.

Each charging terminal 126 extends between a mating end 180 and a terminating end 182. The charging terminal 126 includes a pin 184 at the mating end 180. The pin 184 is configured to be mated with the charging connector during charging of the vehicle. In an exemplary embodiment, a terminal seal 186 surrounds the charging terminal 126. The terminal seal 186 is configured to be sealingly coupled to the housing 110. For example, the terminal seal 186 may be plugged into the terminal channel 118 to seal the terminal channel 118 between the front 130 and the rear 132 of the housing 110. In an exemplary embodiment, the charging terminal 126 includes a threaded bore 190 at the terminating end 182. The threaded bore 190 is configured to receive a threaded portion of the power harness 200 to mechanically and/or electrically connect to the power harness 200. In the illustrated embodiment, the threaded bore 190 extends transversely across the charging terminal 126. For example, the threaded bore 190 extends perpendicular to the longitudinal axis of the charging terminal 126. In an exemplary embodiment, the terminating end 182 includes a connecting surface 192 configured to be connected to the power harness 200. In the illustrated embodiment, the connecting surface 192 is planar. The connecting surface 192 extends along one side of the charging terminal 126. A portion of the power harness 200 may abut against the connecting surface 192 to make an electrical connection with the terminating end 182 of the charging terminal 126. In various embodiments, the end of the charging terminal 126 may be flat. A temperature sensor 194 may be connected to the flat end of the charging terminal 126 to monitor a temperature of the charging terminal 126. The temperature sensor 194 may be connected to other surfaces of the charging terminal 126 in alternative embodiments.

The power harnesses 200 may be identical and inverted 180° relative to each other, such as for mounting to opposite sides of the housing 110. The power harness 200 includes the power cable 202, a harness housing 230, a contact ring 270, a threaded bolt 300, and a threaded socket 350. The harness housing 230 receives the power cable 202, the contact ring 270, the threaded bolt 300, and the threaded socket 350. The harness housing 230 is configured to be mated with the housing 110, such as at the side port 160 of the tube 150. The threaded socket 350 is configured to be threadably coupled to the charging terminal 126. For example, the threaded socket 350 may be threaded into the threaded bore 190. The threaded socket 350 holds the contact ring 270 in electrical contact with the charging terminal 126. The threaded bolt 300 is configured to be threadably coupled to the threaded socket 350. The threaded bolt 300 is used to mechanically connect the power harness 200 to the housing 110. The contact ring 270 is used to electrically connect the power cable 202 to the charging terminal 126.

In an exemplary embodiment, the power cable 202 is a flat cable. The power cable 202 may be manufactured from braided metal tapes that are flat rolled. For example, the braided metal tapes may be aluminum or copper. In alternative embodiments, the power cable 202 may be a metal plate or bar, such as a busbar. The power cable 202 may be s stranded cable in various embodiments. The power cable 202 may be generally rectangular in cross-section, such as having generally planar top and bottom surfaces. However, the outer edges of the power cable 202 may be curved in various embodiments. In various embodiments, the power cable 202 has a width that is at least twice a height of the power cable 202. Optionally, the power cable 202 may have a width that is four times the height, or more. In alternative embodiments, the power cable 202 may be round rather than being flat.

The power cable 202 includes a cable body 204 and a jacket 206 surrounding the cable body 204. The jacket 206 is made from a dielectric or other insulating material to make the power cable 202 touch safe. In an exemplary embodiment, the cable body 204 is exposed at a terminating end 208 of the power cable 202. The power cable 202 includes an opening 210 at the terminating end 208. A ring insert 212 is received in the opening 210. The ring insert 212 is electrically connected to the cable body 204. The ring insert 212 is configured to be coupled to the contact ring 270 when assembled to form a direct electrical path between the contact ring 270 and the cable body 204. Optionally, the ring insert 212 includes a flange 214 along the upper surface and/or the lower surface of the cable body 204. In various embodiments, the ring insert 212 is manufactured from a different metal or metal alloy than the cable body 204. For example, the cable body 204 may be aluminum and the ring insert 212 may be copper. The ring insert 212 includes an opening 216 passing through the center of the ring insert 212. The opening 216 is configured to receive the threaded bolt 300.

In an exemplary embodiment, the power cable 202 includes a cable seal 220 surrounding the cable body 204 and the jacket 206. An inner surface of the cable seal 220 is configured to be sealed against the jacket 206 of the power cable 202. The cable seal 220 may be a rubber material in various embodiments. An outer surface of the cable seal 220 is configured to be sealed to the harness housing 230. In an exemplary embodiment, the power cable 202 includes a cable seal cap 222 surrounding the cable body 204 and the jacket 206. The cable seal cap 222 is used to position the cable seal 220 on the terminating end 208 of the power cable 202. The cable seal cap 222 is used to retain the cable seal 220 in the harness housing 230. In an exemplary embodiment, the cable seal cap 222 includes latches 224 configured to be latchably coupled to the harness housing 230. A front portion of the cable seal cap 222 may be plugged into a portion of the harness housing 230.

The harness housing 230 is manufactured from a dielectric material, such as a plastic material. Optionally, the harness housing 230 may be an injection molded part. The harness housing 230 includes walls forming a chamber 232 that receives the power cable 202, the contact ring 270, and the threaded bolt 300. In an exemplary embodiment, the harness housing 230 includes an outer end 234 and an inner end 236. The inner end 236 faces the housing 110. The harness housing 230 includes sides 238 extending between a front 240 and a rear 242. The harness housing 230 includes an opening at the rear 242 that defines a cable slot 244 providing access to the chamber 232. The power cable 202 is received in the cable slot 244. In various embodiments, the cable slot 244 may be oriented generally vertically; however, other orientations are possible in alternative embodiments. The cable seal cap 222 may be plugged into the cable slot 244 and coupled to the harness housing 230 at the rear 242. The cable seal 220 may be sealed to the interior surface of the harness housing 230 at the cable slot 244.

In an exemplary embodiment, the harness housing 230 includes a hub 250 having a bore 252 passing through the hub 250. The bore 252 is open to and defines a portion of the chamber 232. In various embodiments, the hub 250 is generally cylindrical. However, the hub 250 may have other shapes in alternative embodiments. The bore 252 passes through the harness housing 230, such as along a mating axis. In an exemplary embodiment, the power cable 202 is positioned in the harness housing 230 with the ring insert 212 aligned with the bore 252, such as along the mating axis, to receive the threaded bolt 300. The bore 252 includes an outer opening 254 and an inner opening 256. The threaded bolt 300 is received in the hub 250 and passes through the bore 252. For example, the threaded bolt 300 may pass through the outer opening 254 and/or the inner opening 256. The contact ring 270 is received in the hub 250. For example, the contact ring 270 may be loaded into the bore 252 through the outer opening 254. The threaded bolt 300 may be loaded into the bore 252 through the outer opening 254 behind the contact ring 270.

The contact ring 270 extends between a first end 272 and a second end 274. The first end 272 may be an outer end of the contact ring 270 and the second end 274 may be an inner of the contact ring 270. The second end is configured to face the charging terminal 126. The contact ring 270 includes an opening 276 passing through the contact ring 270 between the first end 272 and the second end 274. The opening 276 is configured to receive the threaded socket 350. In an exemplary embodiment, the contact ring 270 includes a pocket 278 at the first end 272. The pocket 278 is configured to receive a portion of the threaded socket 350 and is used to control relative positioning of the contact ring 270 and the threaded socket 350. For example, threaded socket 350 may bottom out within the pocket 278 to axially position the threaded socket 350 along the contact ring 270. When assembled, the contact ring 270 is received in the hub 250 and aligned with the ring insert 212 of the power cable 202 in the bore 252. For example, the opening 276 is aligned with the opening 216 along the mating axis of the bore 252. The first end 272 of the contact ring 270 is configured to engage and electrically connect to the ring insert 212. The second end 274 is configured to engage and electrically connect to the connecting surface 192 of the charging terminal 126. The threaded socket 350 is configured to press the ring insert 212 into physical and electrical contact with the charging terminal 126. When the threaded bolt 300 is tightened into the threaded socket 350, the ring insert 212 is pressed into physical and electrical contact with the contact ring 270.

The threaded bolt 300 includes a head 302 and a threaded shaft 304 extending from the head 302. The threaded shaft 304 includes threads at a distal end 308 of the threaded shaft 304. In an exemplary embodiment, the threaded bolt 300 is touch safe. For example, the threaded bolt 300 includes an insulating cover 310 on the head 302 and an insulating cap 320 extending from the distal end 308 of the threaded shaft 304.

The insulating cover 310 may be overmolded on to the head 302. Alternatively, the insulating cover 310 may be pre-formed and snap-fit, press-fit, adhered, or otherwise secured to the head 302. The insulating cover 310 covers the head 302 to prevent touching of the metal or conductive portion of the threaded bolt 300. The insulating cover 310 includes drive features 312 for driving or rotating the threaded bolt 300. For example, the drive features 312 may be flat surfaces at the top of the insulating cover 310 that allow a socket wrench or other tool to rotate the threaded bolt 300 clockwise or counterclockwise for tightening or untightening the threaded bolt 300 during assembly with the second harness connector 400. Other types of drive features may be used in alternative embodiments, such as one or more slots to receive a screwdriver or other type of tool for tightening and untightening the threaded bolt 300.

The insulating cap 320 may be overmolded on to the threaded shaft 304. Alternatively, the insulating cap 320 may be pre-formed and snap-fit, press-fit, adhered, or otherwise secured to the distal end 308 of the threaded shaft 304. The insulating cap 320 covers the threaded shaft 304 to prevent touching of the metal or conductive portion of the threaded bolt 300.

In an exemplary embodiment, the power harness 200 includes a bolt seal 330 to seal between the threaded bolt 300 and the harness housing 230. In the illustrated embodiment, the bolt seal 330 is coupled to the insulating cover 310 at the head 302 of the threaded bolt 300. The outer surface of the bolt seal 330 is configured to be sealed to the harness housing 230, such as to the hub 250 when the threaded bolt 300 is received in the hub 250. For example, the bolt seal 330 may have a diameter equal to the diameter of the hub 250 at the outer opening 254.

In an exemplary embodiment, the power harness 200 includes a bolt retainer 340 to retain the threaded bolt 300 in the harness housing 230. The bolt retainer 340 may be coupled to the harness housing 230 outward of the threaded bolt 300, such as outward of the head 302 and the insulating cover 310. The bolt retainer 340 may be coupled to the hub 250. The bolt retainer 340 includes latches 342 configured to be latchably coupled to the harness housing 230 to secure the bolt retainer 340 to the harness housing 230. In an exemplary embodiment, the bolt retainer 340 includes an opening 344 to provide access to the threaded bolt 300, such as for engaging the drive features 312 to rotate the threaded bolt 300. However, in alternative embodiments, the bolt retainer 340 may be closed to prevent access to the threaded bolt 300. In an exemplary embodiment, the bolt retainer 340 includes one or more retaining features 346 to retain the threaded bolt 300 in the harness housing 230. In the illustrated embodiment, the retaining feature 346 is a lip or rim extending into the opening 344. The lip is configured to be seated against the head 302 and/or the insulating cover 310 to prevent removal of the threaded bolt 300 through the opening 344. Other types of retaining features may be used in alternative embodiments.

The threaded socket 350 extends between an inner end 352 and an outer end 354. The threaded socket 350 includes a base 356 at the outer end 354. Optionally, the base 356 as a larger diameter than other portions of the threaded socket 350. For example, the threaded socket 350 is stepped outward at the base 356. In an exemplary embodiment, the threaded socket 350 includes a threaded post 358 extending from the base 356. The threaded post 358 includes external threads 360 along the exterior surface of the threaded post 358. The external threads 360 may extend to a distal end 362 of the threaded post 358. The threaded post 358 is configured to be threadably coupled to the charging terminal 126. For example, the threaded post 358 may be received in the threaded bore 190. In an exemplary embodiment, the threaded socket 350 includes a threaded bore 364 at the outer end 354. The threaded bore 364 includes internal threads 366. The threaded bolt 300 is configured be received in the threaded bore 364. The threaded shaft 304 of the threaded bolt 300 is coupled to the internal threads 366 of the threaded bore 364. In an exemplary embodiment, the threaded socket 350 includes a drive element 368 at the outer end 354. The drive element 368 is used to drive rotation of the threaded socket 350, such as for mating to or unmated from the charging terminal 126. The drive element 368 may receive a tool such as a screwdriver, Alan wrench, torque bit or other type of tool to rotate the threaded socket 350.

In an exemplary embodiment, the power harness 200 includes a mating seal 380 coupled to the harness housing 230 at a mating end 260 of the harness housing 230. In the illustrated embodiment, the mating end 260 is provided at the inner end 236. The mating end 260 is located at the inner opening 256 of the hub 250. The mating end 260 is configured to be mated with the housing 110, such as at the side port 160. In the illustrated embodiment, the mating seal 380 is cylindrical and configured to be plugged into the inner opening 256 of the hub 250 to seal against the hub 250. Optionally, an interior surface of the mating seal 380 may be sealed to the hub 250 and an exterior surface of the mating seal 380 is configured to seal to the side port 160. However, in alternative embodiments, the exterior surface may seal to the hub 250 and the interior surface may seal to the side port 160.

In an exemplary embodiment, the power harness 200 includes a seal retainer 390 to retain the mating seal 380 in the harness housing 230. The seal retainer 390 may be coupled to the harness housing 230 inward of the mating seal 380. The seal retainer 390 may be coupled to the hub 250. The seal retainer 390 includes latches 342 configured to be latchably coupled to the harness housing 230 to secure the seal retainer 390 to the harness housing 230.

Figure 4:
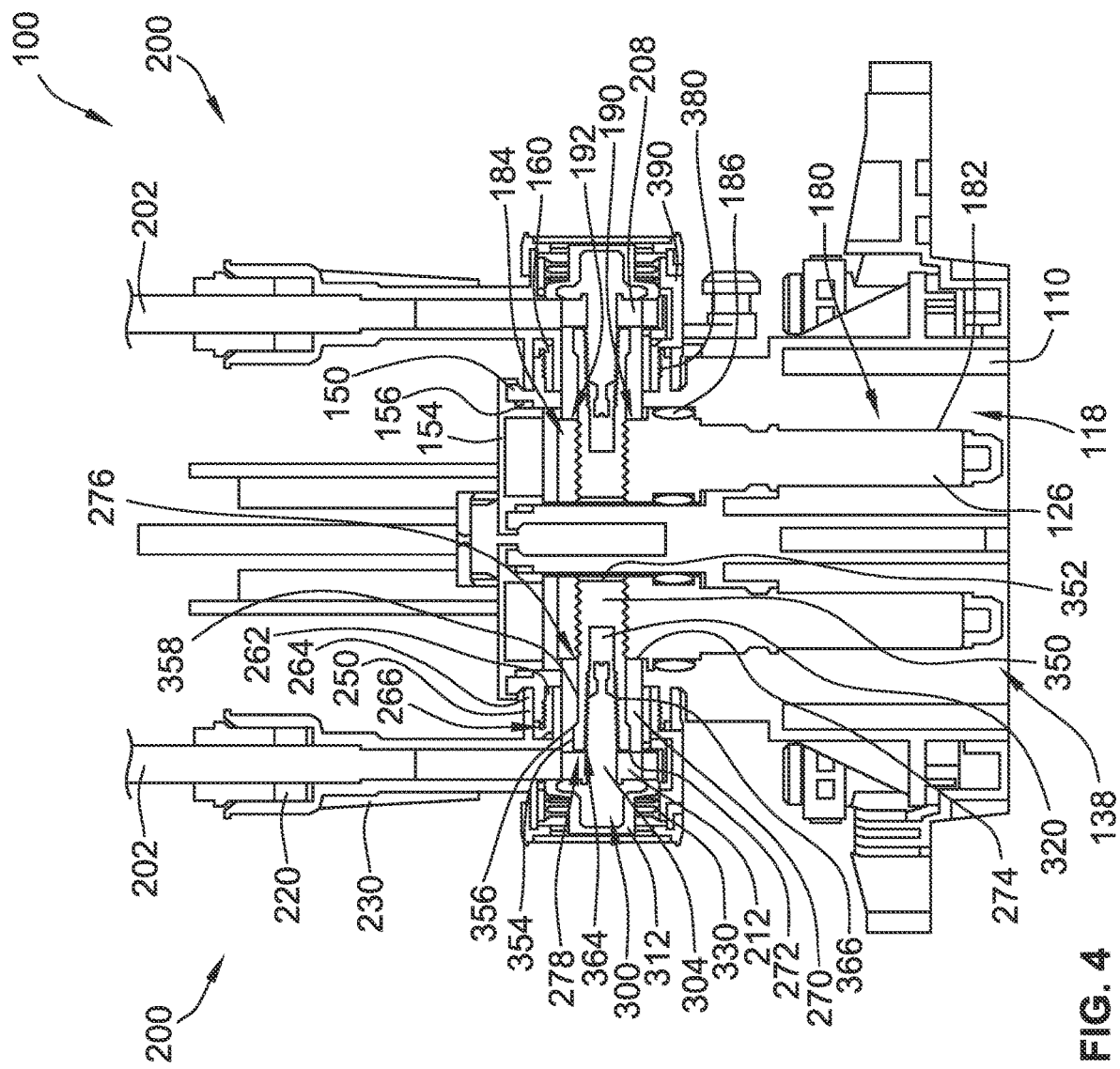
FIG. 4 is a cross sectional view of the charging inlet assembly in an exemplary embodiment showing the power harnesses coupled to the housing and the charging terminals of the charging inlet assembly.

FIG. 4 is a cross sectional view of the charging inlet assembly 100 in an exemplary embodiment showing the power harnesses 200 coupled to the housing 110 and the charging terminals 126 of the charging inlet assembly 100.

During assembly, the charging terminals 126 are loaded into the terminal channels 118. The pins 184 at the mating ends 180 of the charging terminals 126 are located in the DC socket 138 for mating with the charging connector. The terminal seals 186 are sealed to the housing 110 within the terminal channels 118. Latches or other features may engage the charging terminals 126 to hold the charging terminals 126 in the terminal channels 118. The terminating ends 182 are located in the rear portions of the terminal channels 118. In an exemplary embodiment, the threaded bores 190 at the terminating ends 182 are aligned with the side ports 160 for mating with the power harnesses 200. The covers 154 are coupled to the tubes 150 to close the tubes 150. The cover seals 156 are sealed to the housing 110.

During assembly, the threaded socket 350 and the contact ring 270 are coupled to the charging terminal 126. For example, the threaded socket 350 is loaded through the opening 276 in the contact ring 270. The base 356 of the threaded socket 350 is received in the pocket 278. The inner end 352 of the threaded socket 350 extends forward of the second end 274 of the contact ring to interface with the charging terminal 126. For example, the threaded post 358 is received in the threaded bore 190 and threadably coupled thereto. As the threaded socket 350 is tightened, the base 356 presses against the contact ring 270 to pull the contact ring 270 into electrical contact with the connecting surface 192 of the charging terminal 126. In an exemplary embodiment, the outer end 354 of the threaded socket 350 is flush with the first end 272 of the contact ring 270 or recessed into the contact ring 270 to allow the first end 272 of the contact ring 270 to interface with the ring insert 212 of the power cable 202.

During assembly, the threaded bolt 300 is aligned with the threaded socket 350. The hub 250 of the harness housing 230 is aligned with the hub at the side port 160 of the housing 110. In an exemplary embodiment, the mating interfaces are cylindrical allowing mating at various angular orientation relative to each other. In the illustrated embodiment, the power cables 202 are oriented 180° relative to the charging terminals 126; however, the power harness 200 and/or the second harness connector 400 may be oriented at other angular orientation, such as right angles.

During mating, the threaded bolt 300 is plugged into the threaded bore 364 of the threaded socket 350. For example, the insulating cap 320 at the end of the threaded bolt 300 is plugged into the threaded bore 364. When the threaded shaft 304 interfaces with the threads 366 of the threaded bore 364, the threaded bolt 300 is rotated to tighten the threaded bolt 300 to the threaded socket 350. In an exemplary embodiment, the end of the threaded bolt 300 extends from the exterior of the harness housing 230, such as beyond the inner end of the hub 250. The portion of the threaded bolt 300 that is exposed at the exterior of the harness housing 230 is the insulating cap 320. No metal or conductive portion of the threaded bolt 300 is exposed. As such, the power harness 200 is touch safe in the unmated state. The insulating cover 310 covers the top end of the threaded bolt 300 making the power harness 200 touch safe. In an exemplary embodiment, the exposed portions at the terminating ends 208 of the power cables 202 are contained or encapsulated within the housings 230 further making the power harnesses 200 touch safe.

When mated, the charging inlet assembly 100 is sealed from the external environment. For example, the hub of the side port 160 is plugged into the inner end of the hub 250 of the power harness 200. In the illustrated embodiment, the power harness 200 carries the mating seal 380 to interface with the side port 160 during mating. As such, a sealed interface is provided between the power harness 200 and the housing 110. In an exemplary embodiment, other openings in the housing 230 are sealed, such as by the bolt seal 330 and the cable seal 220 of the power harness 200.

In an exemplary embodiment, the hub 250 includes an inner hub ring 262 and an outer hub ring 264. A pocket 266 is formed between the inner hub ring 262 and the outer hub ring 264. The hub at the side port 160 of the housing 110 is configured to be received in the pocket 266 between the inner and outer hub rings 262, 264. The mating seal 380 is received in the pocket 266 to interface with the side port 160. In the illustrated embodiment, the mating seal 380 is provided on the inner hub ring 262. The seal retainer 390 is coupled to the inner hub ring 262 to retain the mating seal 380 on the inner hub ring 262. The inner surface of the mating seal 380 is sealed to the inner hub ring 262 and the outer surface of the mating seal 380 is sealed to an interior surface of the side port 160. However, in alternative embodiments, the mating seal 380 may be provided on the outer hub ring 264 and seal against the exterior surface of the side port 160.

The threaded bolt 300 and the threaded socket 350 are used to mechanically connect the power harness 200 to the housing 110 and the charging terminal 126. For example, the threaded socket 350 holds the contact ring 270 tightly (for example, presses) against the connecting surface 192 of the charging terminal 126. The threaded shaft 304 of the threaded bolt 300 is received in the threaded bore 364 of the threaded socket 350. The threaded bolt 300 is rotated to tighten the threaded shaft 304 in the threaded bore 364. The threaded bolt 300 holds the ring insert 212 tightly (for example, presses) against the contact ring 270. As the threaded bolt 300 is tightened, the power harness 200 is electrically connected to the charging terminal 126. For example, the threaded connection between the threaded bolt 300 and the threaded socket 350 presses the ring insert 212 of the power cable 202 into electrical connection with the contact ring 270. The power cable 202 is electrically connected to the charging terminal 126 via the ring insert 212 and the contact ring 270. In an exemplary embodiment, the contact ring 270 and the ring insert 212 are manufactured from copper and are highly conductive. A low resistance interface is created between the contact ring 270 and the ring insert 212. As such, an efficient power transmission path is created between the power harness 200. A compact, robust, sealed, vibration resistant, and touch safe electrical connection is made between the power harness 200.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power harness for a charging inlet assembly of a vehicle, the power harness comprising:
    a power cable having a cable body extending to a terminating end, the power cable including a ring insert electrically connected to the cable body;
    a harness housing having a chamber including a cable slot and a hub with a bore passing through the harness housing, the cable slot receives the terminating end of the power cable, the ring insert being aligned with the bore, the harness housing having a mating end configured to be mated with a housing of the charging inlet assembly;
    a threaded bolt received in the hub and passing through the bore, the threaded bolt passing through the ring insert, the threaded bolt including a head and a threaded shaft, the threaded bolt including an insulating cover on the head, the threaded bolt including an insulating cap at a distal end of the threaded shaft;
    a contact ring received in the hub and aligned with the ring insert in the bore, the contact ring having an opening between a first end and a second end, the first end engaging and being electrically connected to the ring insert, the second end configured to be electrically connected to a charging terminal of the charging inlet assembly; and
    a threaded socket received in the hub and aligned with the ring insert in the bore, the threaded socket being received in the opening of the contact ring and passing through the contact ring, the threaded socket extending between an inner end and an outer end, the inner end having external threads configured to be threadably coupled to the charging terminal of the charging inlet assembly, the outer end having a threaded bore receiving the threaded shaft of the threaded bolt, the threaded bolt being threadably coupled to the threaded socket.

2. The power harness of claim 1, wherein the inner end of the threaded socket extends forward of the second end of the contact ring to interface with the charging terminal.

3. The power harness of claim 1, wherein the second end of the contact ring extends forward of the mating end of the harness housing for received in the housing of the charging inlet assembly to interface with the charging terminal of the charging inlet assembly.

4. The power harness of claim 1, wherein the outer end of the threaded socket is flush with the first end of the contact ring or recessed into the contact ring to allow the first end of the contact ring to interface with the ring insert.

5. The power harness of claim 1, wherein the threaded socket is configured to be threadably coupled to the charging terminal of the charging inlet assembly prior to threadably coupling the threaded bolt to the threaded bore of the threaded socket.

6. The power harness of claim 1, wherein the power cable includes a cable seal surrounding and being sealed to the power cable, the power cable including a cable seal cap holding the cable seal on the terminating end of the cable body.

7. The power harness of claim 1, wherein the threaded bolt includes a bolt seal seals between the threaded bolt and the housing.

8. The power harness of claim 1, further comprising a mating seal at the mating end of the harness housing, the mating seal configured to seal between the harness housing and the housing of the charging inlet assembly.

9. The power harness of claim 1, wherein the bore is open at a top of the harness housing and open at a bottom of the harness housing, the insulating cover making the threaded bolt touch proof through the open top of the harness housing, the insulating cap making the threaded bolt touch proof through the open bottom of the harness housing.

10. The power harness of claim 1, wherein the threaded bolt presses the contact ring into the mating harness when the threaded bolt is tightened.

11. The power harness of claim 1, further comprising a bolt retainer coupled to the harness housing outward of the threaded bolt to retain the threaded bolt in the hub.

12. The power harness of claim 1, wherein the hub includes an inner hub ring, an outer hub ring, and a pocket between the inner hub ring in the outer hub ring, a mating seal received in the pocket and sealed to the inner hub ring, the pocket configured to receive a mating hub of the housing to interface with the mating seal.

13. The power harness of claim 1, wherein the insulating cap of the threaded bolt extends beyond an end of the harness housing to an exterior of the harness housing to mate with the threaded socket.

14. A charging inlet assembly comprising:
    a housing extending between a front and a rear, the housing having a charging socket configured to receive a charging connector at the front, the housing including terminal channels in the charging socket;
    charging terminals received in the terminal channels, the charging terminals including pins at the front for mating with the charging connector, the charging terminals including terminating portions at the rear, the terminating portions including threaded bores; and
    power harnesses coupled to the terminating portions of the corresponding charging terminals, each power harness comprising:
    a power cable having a cable body extending to a terminating end, the power cable including a ring insert electrically connected to the cable body;

a harness housing having a chamber including a cable slot and a hub with a bore passing through the harness housing, the cable slot receives the terminating end of the power cable, the ring insert being aligned with the bore, the harness housing having a mating end mated with the housing of the charging inlet assembly;

a threaded bolt received in the hub and passing through the bore, the threaded bolt passing through the ring insert, the threaded bolt including a head and a threaded shaft, the threaded bolt including an insulating cover on the head, the threaded bolt including an insulating cap at a distal end of the threaded shaft;

a contact ring received in the hub and aligned with the ring insert in the bore, the contact ring having an opening between a first end and a second end, the first end engaging and being electrically connected to the ring insert, the second end configured to be electrically connected to a charging terminal of the charging inlet assembly; and a threaded socket received in the hub and aligned with the ring insert in the bore, the threaded socket being received in the opening of the contact ring and passing through the contact ring, the threaded socket extending between an inner end and an outer end, the inner end having external threads configured to be threadably coupled to the charging terminal of the charging inlet assembly, the outer end having a threaded bore receiving the threaded shaft of the threaded bolt, the threaded bolt being threadably coupled to the threaded socket.

15. The charging inlet assembly of claim 14, wherein the housing includes tubes surrounding the terminal channels at the rear, each tube including a side port accessing the terminal channel through a side of the tube, wherein the terminating portion of the corresponding charging terminal is aligned with the side port, the contact ring and the threaded socket extending through the side port to interface with the charging terminal.

16. The charging inlet assembly of claim 14, further comprising a temperature sensor thermally coupled to the terminating end of the corresponding charging terminal to monitor a temperature of the corresponding charging terminal.

17. The charging inlet assembly of claim 14, wherein the inner end of the threaded socket extends forward of the second end of the contact ring to interface with the charging terminal, and wherein the second end of the contact ring extends forward of the mating end of the harness housing for receipt in the housing to interface with the charging terminal.

18. The charging inlet assembly of claim 14, wherein the threaded socket is threadably coupled to the charging terminal prior to threadably coupling the threaded bolt to the threaded bore of the threaded socket.

19. The charging inlet assembly of claim 14, wherein the power cable includes a cable seal surrounding and being sealed to the power cable, and wherein the threaded bolt including a bolt seal seals between the threaded bolt and the housing, the power harness further comprising a mating seal at the mating end of the harness housing, the mating seal configured to seal between the parties housing and the housing of the charging inlet assembly.

20. A charging inlet assembly comprising:

a housing extending between a front and a rear, the housing having a charging socket configured to receive a charging connector at the front, the housing including terminal channels in the charging socket;

charging terminals received in the terminal channels, the charging terminals including pins at the front for mating with the charging connector, the charging terminals including terminating portions at the rear, the terminating portions including threaded bores; and power harnesses coupled to the terminating portions of the corresponding charging terminals, each power harness comprising:

a power cable having a cable body extending to a terminating end, the power cable including a ring insert electrically connected to the cable body, the power cable including a cable seal surrounding and being sealed to the power cable, the power cable including a cable seal cap holding the cable seal on the terminating end of the cable body;

a harness housing having a chamber including a cable slot and a hub with a bore passing through the harness housing, the cable slot receives the terminating end of the power cable, the ring insert being aligned with the bore, the harness housing having a mating end mated with the housing of the charging inlet assembly;

a threaded bolt received in the hub and passing through the bore, the threaded bolt passing through the ring insert, the threaded bolt including a head and a threaded shaft, the threaded bolt including an insulating cover on the head, the threaded bolt including an insulating cap at a distal end of the threaded shaft, the threaded bolt including a bolt seal sealed between the threaded bolt and the harness housing;

a contact ring received in the hub and aligned with the ring insert in the bore, the contact ring having an opening between a first end and a second end, the first end engaging and being electrically connected to the ring insert, the second end configured to be electrically connected to a charging terminal of the charging inlet assembly;

a threaded socket received in the hub and aligned with the ring insert in the bore, the threaded socket being received in the opening of the contact ring and passing through the contact ring, the threaded socket extending between an inner end and an outer end, the inner end having external threads configured to be threadably coupled to the charging terminal, the outer end having a threaded bore receiving the threaded shaft of the threaded bolt, the threaded bolt being threadably coupled to the threaded socket; and a mating seal configured to seal between the harness housing and the housing.

* * * * *